(12) United States Patent
Bonte et al.

(10) Patent No.: US 11,135,816 B2
(45) Date of Patent: Oct. 5, 2021

(54) VEHICLE COMPONENTS FORMED WITH EPOXIDIZED CHOPPED GLASS BONDED TO A THERMOSET MATRIX

(71) Applicants: Continental Structural Plastics, Inc., Auburn Hills, MI (US); Michael J. Hiltunen, Rochester, MI (US)

(72) Inventors: Philippe Bonte, Pouance (FR); Marc-Philippe Toitgans, Pouance (FR); Dominique Boyer, Pouance (FR); Michael J. Siwajek, Rochester Hills, MI (US); Probir Kumar Guha, Bloomfield Hills, MI (US); Michael J. Hiltunen, Rochester, MI (US); Shane Skop, Auburn Hills, MI (US)

(73) Assignee: CONTINENTAL STRUCTURAL PLASTICS, INC., Auburn Hills, MI (US)

( * ) Notice: Subject to any disclaimer, the term of this patent is extended or adjusted under 35 U.S.C. 154(b) by 217 days.

(21) Appl. No.: 16/092,504

(22) PCT Filed: Apr. 11, 2017

(86) PCT No.: PCT/US2017/026911
§ 371 (c)(1),
(2) Date: Oct. 10, 2018

(87) PCT Pub. No.: WO2017/180560
PCT Pub. Date: Oct. 19, 2017

(65) Prior Publication Data
US 2019/0160794 A1    May 30, 2019

Related U.S. Application Data

(60) Provisional application No. 62/320,963, filed on Apr. 11, 2016.

(51) Int. Cl.
*B32B 27/08* (2006.01)
*B32B 27/20* (2006.01)
(Continued)

(52) U.S. Cl.
CPC .............. *B32B 27/08* (2013.01); *B29C 70/12* (2013.01); *B29C 70/78* (2013.01); *B32B 3/04* (2013.01);
(Continued)

(58) Field of Classification Search
CPC ..... B29C 70/12; B29C 70/78; B29K 2307/04; B29K 2309/08; B29L 2031/30;
(Continued)

(56) References Cited

U.S. PATENT DOCUMENTS

| 3,288,707 A | 11/1966 | Hurwitz et al. |
| 4,260,538 A | 4/1981 | Iseler et al. |

(Continued)

FOREIGN PATENT DOCUMENTS

| EP | 1044942 A1 | 10/2000 |
| EP | 2810989 A1 | 12/2014 |

(Continued)

OTHER PUBLICATIONS

Rules 70(2) and 70a(2) EPO Communication in EP appln. No. 17782942.1, dated Dec. 17, 2019, with SESR.

*Primary Examiner* — Camie S Thompson
(74) *Attorney, Agent, or Firm* — Blue Filament Law PLLC (57) ABSTRACT

A process is provided for molding a resin matrix around a distribution of well distributed epoxy coated glass fibers to produce an article. The article is mass produced by the molding process based on a one or more layer structure, with an outer panel having a high degree of surface smoothness common to automotive body panels and a comparatively (Continued)

high tensile strength joinder thereto. The epoxy coated glass fibers are present in a single panel of an article or all such panels of a multiple layer article. The epoxy coated glass fibers can be present in an articles in a form of: chopped glass fibers that are intermixed and vary in orientation, a woven roving containing predominately epoxy glass fibers with carbon fibers dispersed there through, or non-woven fiber mats.

13 Claims, 4 Drawing Sheets

(51) Int. Cl.

| | | |
|---|---|---|
| B32B 7/02 | (2019.01) | |
| B32B 27/30 | (2006.01) | |
| B32B 27/28 | (2006.01) | |
| B32B 5/02 | (2006.01) | |
| B32B 27/36 | (2006.01) | |
| B32B 5/08 | (2006.01) | |
| B32B 3/06 | (2006.01) | |
| B32B 27/38 | (2006.01) | |
| B32B 3/04 | (2006.01) | |
| B29C 70/12 | (2006.01) | |
| B29C 70/78 | (2006.01) | |
| B32B 7/12 | (2006.01) | |
| B32B 27/12 | (2006.01) | |
| B29K 307/04 | (2006.01) | |
| B29K 309/08 | (2006.01) | |
| B29L 31/30 | (2006.01) | |

(52) U.S. Cl.
CPC ............ *B32B 3/06* (2013.01); *B32B 5/022* (2013.01); *B32B 5/024* (2013.01); *B32B 5/08* (2013.01); *B32B 7/02* (2013.01); *B32B 7/12* (2013.01); *B32B 27/12* (2013.01); *B32B 27/20* (2013.01); *B32B 27/285* (2013.01); *B32B 27/30* (2013.01); *B32B 27/302* (2013.01); *B32B 27/306* (2013.01); *B32B 27/36* (2013.01); *B32B 27/38* (2013.01); *B29K 2307/04* (2013.01); *B29K 2309/08* (2013.01); *B29L 2031/30* (2013.01); *B32B 2255/02* (2013.01); *B32B 2255/26* (2013.01); *B32B 2260/021* (2013.01); *B32B 2260/046* (2013.01); *B32B 2262/02* (2013.01); *B32B 2262/0253* (2013.01); *B32B 2262/0261* (2013.01); *B32B 2262/0269* (2013.01); *B32B 2262/0276* (2013.01); *B32B 2262/0284* (2013.01); *B32B 2262/062* (2013.01); *B32B 2262/065* (2013.01); *B32B 2262/067* (2013.01); *B32B 2262/101* (2013.01); *B32B 2262/103* (2013.01); *B32B 2262/106* (2013.01); *B32B 2262/14* (2013.01); *B32B 2264/10* (2013.01); *B32B 2264/102* (2013.01); *B32B 2264/104* (2013.01); *B32B 2264/12* (2013.01); *B32B 2307/406* (2013.01); *B32B 2307/4026* (2013.01); *B32B 2307/50* (2013.01); *B32B 2307/54* (2013.01); *B32B 2307/72* (2013.01); *B32B 2307/73* (2013.01); *B32B 2307/732* (2013.01); *B32B 2605/00* (2013.01); *B32B 2605/08* (2013.01)

(58) Field of Classification Search
CPC ........... B32B 7/12; B32B 5/022; B32B 5/024; B32B 3/06; B32B 27/38; B32B 27/20; B32B 27/08; B32B 2260/021; B32B 2260/046; B32B 2307/72; B32B 2605/00; B32B 2605/08; B32B 2262/0253; B32B 2262/0261; B32B 2262/0284; B32B 2262/062; B32B 2262/065; B32B 2262/067; B32B 2262/101; B32B 2262/103; B32B 2262/106; B32B 2262/14; B32B 2262/10; B32B 7/02; B32B 5/08; B32B 3/04; B32B 27/12302; B32B 27/285; B32B 27/305; B32B 27/09; B32B 2262/02; B32B 2262/0276; B32B 2262/0269; B32B 2307/4026; B32B 2307/04; B32B 2307/73; B32B 2307/406; B32B 2307/50; B32B 2307/732; B32B 2264/12; B32B 2264/10; B32B 2264/104; B32B 2264/102; B32B 2255/02; B32B 2255/06
USPC ....... 428/297.4, 426; 427/386; 252/511, 502
See application file for complete search history.

(56) References Cited

U.S. PATENT DOCUMENTS

| | | | |
|---|---|---|---|
| 4,643,126 A | 2/1987 | Wilkinson et al. | |
| 5,100,935 A | 3/1992 | Iseler et al. | |
| 5,268,400 A | 12/1993 | Iseler et al. | |
| 5,753,164 A | 5/1998 | Ritchie et al. | |
| 5,840,370 A | 11/1998 | Woodside et al. | |
| 5,854,317 A | 12/1998 | Rinz | |
| 6,780,923 B2 | 8/2004 | Guha et al. | |
| 7,465,764 B2 | 12/2008 | Adzima et al. | |
| 7,655,297 B2 | 2/2010 | Guha et al. | |
| 9,868,829 B2 | 1/2018 | Guha et al. | |
| 2006/0258781 A1 | 11/2006 | Beach et al. | |
| 2007/0057404 A1 | 3/2007 | Hager et al. | |
| 2008/0096032 A1 | 4/2008 | Guha et al. | |
| 2015/0352818 A1 | 12/2015 | Glotin et al. | |
| 2019/0358914 A1* | 11/2019 | Boyer | B32B 7/08 |

FOREIGN PATENT DOCUMENTS

| | | |
|---|---|---|
| JP | H06-128474 A | 5/1994 |
| WO | 2006091031 A1 | 8/2006 |
| WO | 2014210310 A1 | 12/2014 |

\* cited by examiner

VEHICLE COMPONENTS FORMED WITH EPOXIDIZED CHOPPED GLASS BONDED TO A THERMOSET MATRIX

CROSS-REFERENCE TO RELATED APPLICATION

This application claims priority of U.S. Provisional Patent Application Ser. No. 62/320,963 filed Apr. 11, 2016, which is incorporated herein by reference.

FIELD OF THE INVENTION

The present invention in general relates to fiber filled articles and, more particularly, to a process for molding with a non-oriented epoxy coated chopped glass fiber tow that bonds to a thermoset matrix.

BACKGROUND OF THE INVENTION

There is a continuing drive to improve vehicle performance and efficiency. In the continuum of processes to lighten vehicle body panels, steel thickness was reduced and then supplanted with lower density materials such as aluminum and resin based materials. Evidence is developing that aluminum has several limitations that favor resin based vehicle body articles. It now appears that the material costs, forming costs, and the tensile strength of aluminum at the thicknesses needed to achieve ever lighter body panels create a collective limitation. In contrast, resin based articles can be tailored by changes in resin chemistry and additives to meet a range of requirements. Additionally, while metal forming of complex shapes requires several steps, a well-designed mold can impart complex shapes in a single step.

While glass fibers have been used for decades to reinforce resin articles such as sheet molding compositions (SMCs), the comparatively high density of glass and the limitations in tensile strength and modulus obtainable appear to make glass filled resins alone incapable of meeting the requirements for ever-lighter, yet strong vehicle panel articles. While carbon fiber filled resins are able to achieve reductions in density and higher tensile strengths and modulus relative to glass-filled like resins, the resulting articles have higher material costs and lack the surface gloss of like articles formed with glass fiber filler.

U.S. Pat. No. 5,840,370 to Woodside et al. discloses a process for forming pre-impregnated fibers suitable for making a composite article. A plurality of fibers are pre-impregnated with about 50% by weight of an aqueous-based chemical treatment containing a curable resin, and then contacted with a drying device which effects drying of the chemical treatment without effecting full curing of the resin. The pre-impregnated fibers may then be formed into a composite article in a subsequent forming operation, for example, by filament winding, pultrusion, weaving, knitting, or extrusion coating.

U.S. Pat. No. 7,465,764 to Adzima et al. discloses a sizing composition containing an epoxy resin emulsion, one or more coupling agents, a cationic lubricant, and an acid. The epoxy resin emulsion includes a low molecular weight epoxy and one or more surfactants. The epoxy resin has an epoxy equivalent weight of from 175-225, preferably from 175-190. Optionally, the sizing composition may also contain a non-ionic lubricant, a polyurethane film former, and/or an antistatic agent. The sizing composition may be used to size glass fibers used in filament winding applications to form reinforced composite articles with improved mechanical properties, wet tensile properties, improved resistance to cracking, and improved processing characteristics.

Thus, there exists a need for a way to provide controlled dispersion of primary glass fibers for use in resin molding that overcome the limitations in tensile strength and modulus obtainable with glass filled resins that are presently incapable of meeting the requirements for ever-lighter, yet strong vehicle panel articles. There further exists a need for an article produced from such primarily glass fibers. Still further, there exists a need to mass produce such articles through methods of RTM, wet molding, compression molding, and injection molding

SUMMARY OF THE INVENTION

A dual layer cured composite article is provided with an outer part and an inner part. The outer part has a thickness composed of a first resin matrix having between 50 and 70 total weight percent of the outer part of an outer part mixed fiber filler, where the mixed fiber filler has an outer part primary fiber:carbon fiber ratio of 0.05-20:1. The inner part is complementary to the outer part and has an inner part thickness composed of a second resin matrix having between 40 and 60 total weight percent of the inner part of an inner mixed fiber filler, the inner mixed fiber filler having an inner part primary fiber of an epoxy coated glass fibers: carbon fiber ratio of less than the outer part primary fiber: carbon fiber ratio. A joinder is present between the outer part and the inner part.

A process of forming an article or a part of the article is provided. The process includes forming a mixed fiber source including interspersed primary fiber of an epoxy coated glass fiber and carbon fiber, adding mixed fiber fill from the mixed fiber source to a mold cavity, delivering a thermoset resin to the mold cavity; and applying pressure and heat to the thermoset resin to form a matrix of cured resin containing the mixed fiber source to form the article or the part of the article.

BRIEF DESCRIPTION OF THE DRAWINGS

The present invention is further detailed with respect to the following drawings. These drawings are not intended to limit the scope of the appended claims, but rather to illustrate specific embodiments thereof.

DESCRIPTION OF THE INVENTION

The present invention has utility as a process for molding a resin matrix around a distribution of well distributed epoxy coated glass fibers. In particular, an article is mass produced by a molding process based on a one or more layer structure, with an outer panel having a high degree of surface smoothness common to automotive body panels and a comparatively high tensile strength joinder thereto. The epoxy coated glass fibers are present in a single panel of an article or all such panels of a multiple layer article. It is appreciated that the epoxy coated glass fibers can be present in an articles in a form of: chopped glass fibers that are intermixed and vary in orientation, a woven roving containing predominately epoxy glass fibers with carbon fibers dispersed there through, or non-woven fiber mats.

A surprising discovery has been made that a conventional glass fiber that is coated with epoxy such as the epoxy coated glass fibers disclosed in U.S. Pat. Nos. 5,840,370 and 7,465,764 provides exceptionally high strength auto parts. Although not wishing to be bound by theory, it is believed that epoxy coating on the glass fiber while not being tacky still has reactive functionality. The epoxy coated fibers have a strong covalent bond between the epoxy and the glass fiber surface. When these fibers are used in a standard SMC resin of vinyl ester, epoxy, etc., the epoxy on the glass fiber covalently bonds (cross-links) along with the resin to become part of the matrix. The energy that is required to pull the glass fibers increases to levels not previously observed in previous glass fiber reinforced resin articles (because covalent bonds must be broken to pull the epoxy coated glass fiber free of matrix). The epoxy coated glass fibers are typically sold as a bundle of fibers that is 72% glass fiber and the remainder of the weight being epoxy resin coating that has been powder coated onto the glass fiber surface.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

As used herein, "compression molding" is defined to include stamping, pultrusion, and overmolding processes.

Stamping is a process in which a stack of organosheets, tapes, or a combination thereof are heated then pressed with a die and cooled. An organosheet or the tape is readily made with a mixed fibers, with a tape typically continuous in unidirection while an organosheet is typically continuous in a woven mesh.

Pultrusion is a process for producing continuous lengths of reinforced polymer structural shapes with constant cross-sections. Raw materials are a liquid resin mixture containing resin, fillers and specialized additives and organosheet or tape as reinforcing fibers. It is often used to form vehicle articles such as profiles and beams.

Overmolding involvers forming by stamping of a sheet of fibers (glass or carbon or a mixed of fibers) impregnated with thermoplastics matrix to from an insert that is placed in a mold cavity with a thermoplastics polymers often filled fiber fillers enrobing the insert. It is appreciated that a preform of a mix of glass/carbon fibers and thermoplastics fibers is also suitable in this process.

RTM is a process by which a preform is made with mixed filler fibers and a small percentage of thermoplastics fibers of approximately 1 to 10 total weight percent. The thermoplastic fiber acting as a binder.

As used herein. "entangled fibers" are defined as fibers having non-parallel contact points between adjacent fibers along the lengths thereof.

A fiber suitable for intermixing with carbon fiber to form an inventive article illustratively includes glass; thermoplastics of polyethylene, polypropylene, polyamides, polyimides, polyether ether ketone (PEEK), polycarbonates, polyethylene terephthalate (PET), copolymers of any of the aforementioned, and mixtures of any of the aforementioned individual polymers or copolymers; natural fibers of cotton, wool, hemp, cane, bamboo, jute, straw, silk, straw, palm frond, coconut husk, coconut fiber; and combinations thereof. Typical lengths of filler fibers when used in chopped forms used in the present invention typically range from 0.5 to 6 centimeters (cm). The diameters of filler fibers are appreciated to vary widely based on commercial sources with glass filler fibers having typical diameters of 0.03 to 0.5 millimeters (mm); carbon filler fibers having typical diameters of 0.005 to 0.1 mm; and natural filler fibers having typical diameters of 0.01 to 0.3 mm. It should be appreciated that fiber dimensions outside of the aforementioned typical ranges exist and are intended to be within the scope of the present invention.

As used herein, a fiber suitable for intermixing with carbon fiber is termed a primary fiber. It is to be understood that a primary fiber does not imply most total fiber weight is primary fiber unless so stated.

Figure 1:
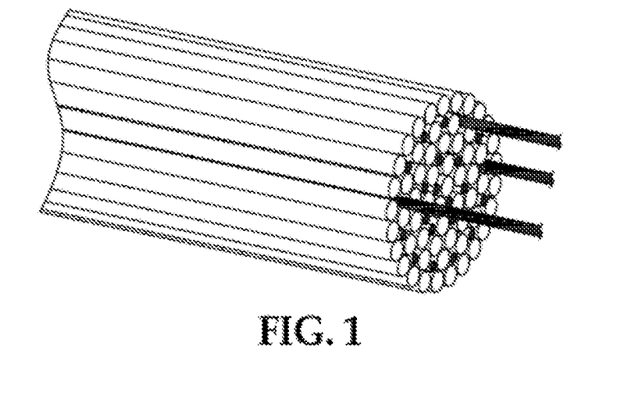
FIG. 1 is a perspective view of a mixed fiber bundle tow that upon being chopped provides randomly oriented primary and carbon fibers for the process of article formation according to the present invention.

A mixed fiber tow is formed in a variety of ways including by interspersing single carbon fibers or bundles of carbon fibers into a tow of primary fibers either through spreading of each tow after separate formation or through simultaneous joinder to form an initial mixed fiber tow. The weight ratio of primary fibers to carbon fibers in a mixed fiber tow ranges from 0.05-20:1 of primary fiber:carbon fiber. A perspective view of such a tow prior to chopping is shown in FIG. 1 in which filled fibers denote carbon fibers and unfilled fibers are primary fibers.

Figure 2:
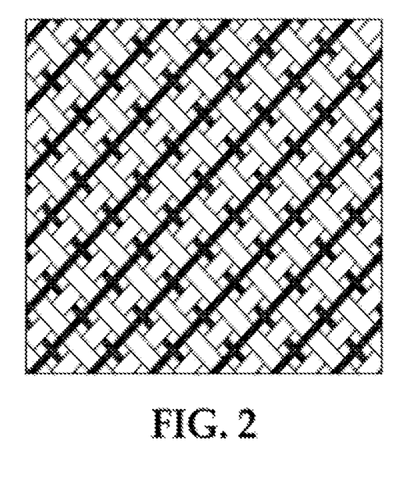
FIG. 2 is a perspective view of mixed fiber woven roving that is operative in the present invention as either a sheet or source of chopped randomly oriented primary and carbon fibers for the process of article formation according to the present invention.

A mixed fiber woven roving has at least one spool of carbon fiber interwoven with the roving formation from primary fiber or by subsequently stitching carbon fiber single threads or multiple fiber carbon fiber bundles into such a roving. The weight ratio of primary fibers to carbon fibers in a mixed fiber woven roving ranges from 0.05-20:1 of primary fiber:carbon fiber. A perspective view of such a woven is shown in FIG. 2 in which filled fibers denote carbon fibers and unfilled fibers are primary fibers. The carbon fiber used in the present invention being virgin or recycled carbon fiber.

Figure 3:
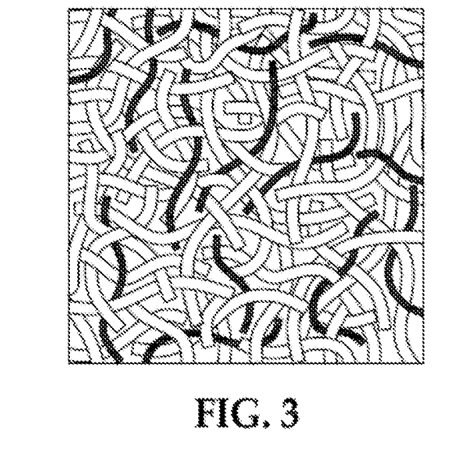
FIG. 3 is a perspective view of mixed fiber non-woven mat that is operative in the present invention as either a sheet or source of chopped randomly oriented primary and carbon fibers for the process of article formation according to the present invention.

A mixed fiber non-woven mat is formed by conventional spunlace techniques in which are needlepunching and spinlacing (hydroentanglement) that intertwine thermoplastic and carbon fibers. Spinlacing uses high-speed jets of water to strike a web so that the fibers knot about one another. In an alternate embodiment, spinbonding of a thermoplastic fiber equipped with a deflector and entraining carbon fiber into the spinbond allows a nonwoven mat to be formed containing a preselected amount of carbon fiber. The weight ratio of primary thermoplastic fibers to carbon fibers in a mixed fiber woven roving ranges 1-50:1 of primary thermoplastic fiber, carbon fiber. A perspective view of such a mat is shown in FIG. 3 in which filled fibers denote carbon fibers and unfilled fibers are primary fibers.

The mixed fibers produced according to the present invention are well suited for forming articles through a process of sheet molding, overmolding, resin transfer molding (RTM), or wet molding.

A variety of base resin formulations benefit from incorporation of the inventive mixed fibers as chopped tow, shredded rovings, or mats. Base formulations suitable to incorporate mixed fibers with the base SMC include those described in U.S. Pat. Nos. 4,260,538; 4,643,126; 5,100,935; 5,268,400; 5,854,317 and 6,780,923.

A principal component of a base resin formulation is a cross-linkable polymer resin such as an unsaturated polyester resin or vinyl ester resin. The prepolymer polymeric resin has a molecular weight on average of typically between 200 and 50,000 Daltons. The polyester prepolymer resins typically represent condensation products derived from the condensation of unsaturated dibasic acids and/or anhydrides with polyols. It is appreciated that the saturated di- or poly-acids are also part of the condensation process to form polyester prepolymers with a lesser equivalency of reactive ethylenic unsaturation sites.

Vinyl ester resins are also typically employed in base resin formulations as a polymeric resin. Vinyl ester prepolymer resins are typically the reaction product of an epoxy resin with a carboxylic acid having a single ethylenic unsaturation. Specific vinyl ester resins commonly used are the reaction product of epoxy functionalized bisphenol A with an acrylic acid. As a result of the difference in prepolymer synthesis, the vinyl ester resin prepolymers are typically associated with terminal ethylenic unsaturations while polyester resin prepolymers predominantly have ethylenic unsaturations internal to the prepolymer backbone.

The polymeric resin prepolymer is suspended, and preferably dissolved, in an ethylenically unsaturated monomer that copolymerizes with the resin during the thermoset process. Representative monomers illustratively styrene, vinyl toluene, divinyl benzene, acrylic acid esters and methacrylic acid esters, illustratively including methylacrylate, ethylacrylate, n-butylacrylate, 2-ethylhexylacrylate, methylmethacrylate, pentaerythritol thiacrylate, ethyleneglycol dimethacrylate, diallyl maleate, diallyl fumarate, triallycyanurate, vinyl acetate, vinyl propionate, vinyl ether, acrylonitrile, and the like. It is appreciated that more than one type of monomer may be used in a molding composition. The monomer provides benefits including lower prepolymer viscosity and thermosetting without formation of a volatile byproduct.

A typical molding composition includes a free radical initiator to initiate cross-linking between the polymeric prepolymer resin with itself or with ethylenically unsaturated monomer, if present. A free radical initiator is typically chosen to preclude significant cross-linking at lower temperature so as to control the thermoset conditions. Conventional free radical polymerization initiators contain either a peroxide or azo group. Peroxides operative herein illustratively include benzoyl peroxide, cyclohexanone peroxide, ditertiary butyl peroxide, dicumyl peroxide, tertiary butyl perbenzoate and 1,1-bis(t-butyl peroxy)3,3,5-trimethylcyclohexane. Azo species operative herein illustratively include azobisisobutyronitrile and t-butylazoisobutyronitrile. While the quantity of free radical polymerization initiator present varies with factors such as desired thermoset temperature and decomposition thermodynamics, an initiator is typically present from 0 to 3 total weight percent.

In order to lessen cross-linking at temperatures below the desired thermoset temperature, a polymerization inhibitor is often included in base molding formulations. Hydroquinone and t-butyl catechol are conventional inhibitors. An inhibitor is typically present between 0 and 2 total weight percent.

Chopped mixed fibers are added to the uncured base resin formulation mixture in amounts of from 5 to 40 total weight percent. Other additives conventional illustratively include low profile additives, colorants, particle fillers such as hollow microspheres of from 10 to 70 microns or inorganic carbonates, and antioxidants are also readily added. Hollow microspheres are readily derivatized to covalently bond to a resin matrix and thereby increase the pull strength of the resulting cured article. The use of such microspheres is detailed in U.S. Pat. Pub. No. 2006/0258781; and U.S. provisional application 62/018,377. It is appreciated that the resulting cured article is rendered electrically conductive while still having a high-quality surface finish through the addition of particulate as detailed in U.S. Pat. No. 7,655,297 B2.

In overmolding, an insert or substrate with non-oriented thermoplastic fibers present in an amount that allows them to thermally bond in the presence of non-oriented filler of mixed primary and carbon fibers. The primary fibers being the same as the thermoplastic fibers or different therefrom. The thermoplastic fiber fusion retains the mixed filler fibers within the insert upon cooling. The filler fibers are selected to modify the properties of the insert and an overmolded article formed with the insert therein. A mixed fiber of glass and carbon fibers is particularly well suited for producing high tensile strength vehicle body panels.

Melt processable materials typically used in overmolding include elastomers and thermoplastics. The resulting dry preform of fused elastomeric or thermoplastic retained a shape with embedded mixed fibers as randomly oriented fibers, woven roving, or unwoven mat is suitable for overmolding by processes such as RTM and wet molding.

The preform so produced is amenable to placement onto a mold platen for injection of resin through a process of RTM or wet molding. It is appreciated that the resin so applied to coat the preform is either inclusive of glass fibers, carbon fibers or the mixed fibers of the present invention; or is devoid of additional fiber content. It is appreciated that the flow of resin entraining fibers leads to partially oriented and inhomogeneous fiber fill in the resulting article, especially in article regions of atypical flow such as around edges and curves. Wet molding or applying resin devoid of fiber fillers to a preform appear to inhibit partially oriented and inhomogeneous fiber fill in the resulting article. Limiting differences in localized fiber concentration and inhomogeneity of fiber orientation are manifest in a lower required safety margin in design of the article. As a result, wet molding is a process chosen in certain inventive embodiments to form high tensile strength articles with minimal thickness and therefore weight.

Articles produced according the present invention are used in a variety of applications illustratively including vehicle components such as an automotive vehicle deck lid, a vehicle door, a vehicle roof, a vehicle fender, a vehicle floor, bumpers, floor, a vehicle body in white component (A or B pillar). Articles formed with the inventive process yield weight reductions compared to conventional aluminum and SMC moldings, while delivering superior tensile strength. High tensile strength is best imparted by resort to a dual or more layer article in which a comparatively higher density outer layer is produced that contains a higher ratio of primary fiber to carbon fiber with an emphasis on cosmetic appearance relative to an inner layer having a higher proportion of carbon fiber to primary fiber to impart tensile strength to the article upon contact joinder between the layers. It is appreciated still further control can be exerted over article properties by adjusting the relative thickness of an outer layer to an inner layer of an article. A joinder for a dual or multilayer article includes both mechanical fasteners and an intermediate adhesive layer. Suitable adhesives illustrative include urethanes and epoxides. A particular preferred resin is epoxide for RTM and polyamide for stamping, pultrusion, or overmolding. It has been surprisingly discovered that a superior article is formed from a mixed fiber tow, or mixed fiber fabric. Without intending to be bound by a particular theory, it is believed that a mixed fiber source provides a more homogenous distribution of fibers than obtained from mono-type fiber sources that are mixed during the chopping process. The more homogenous distribution of fibers is associated with superior article properties compared to conventionally mixing of chopped mono-type source fibers.

In one embodiment of the present invention, an outer layer, synonymously referred to as an outer part, of an article is formed that has a primary fiber:carbon fiber ratio of between 0.05-20:1 with a total fiber loading of primary and carbon fiber in the outer layer of between 50 and 70 total weight percent. The primary fiber in specific inventive embodiments of the outer layer is glass fiber. An outer layer has a specific gravity of between 0.9 and 1.3. A joined inner layer in contrast to the outer layer has a primary fiber:carbon fiber ratio that is less than that in the outer part. The primary fiber in specific inventive embodiments of the inner layer is an epoxy coated glass fiber. An outer layer has a specific gravity of between 0.9 and 1.6. The ratio of outer layer to inner layer thickness being between 1-2:1. By way of example, an outer layer has a typical thickness of 0.9 to 3.5 mm; and an inner layer has a typical thickness of 0.9 to 2.4 mm, in specific embodiments, the outer layer has a higher ratio of primary fiber:carbon fiber and a greater thickness than a joined inner layer. In still other embodiments, the outer layer has a surface capable of finishing to a conventional new automobile surface gloss, as measured by ASTM D523.

Mixed filler fibers are applied directly onto a mold platen, formed as a preform alone, premixed with uncured resin, or through overmolding with thermoplastic fibers. Such mixed chopped fibers either applied to a mold surface as a dry mass or as a slurry. It is appreciated that thermoplastic fibers and various filler fibers are applied sequentially to a mold surface or premixed to form a fiber mixture. A slurry, if present is formed that includes a source of fibers of a given diameter that have been cut to a predetermined length or a variety of lengths; the fibers being in a solvent along with additives. The additives including a dispersing agent, particulate fillers to promote drying, binders, or a combination thereof. An inventive slurry applied using a conventional preform system or used with an inventive centrifugal preform system.

A solvent for an inventive slurry is largely dictated only by handling properties and compatibility with mold form materials, fibers, and slurry additives. Solvents operative herein illustratively include water, $C_1$-$C_{12}$ alcohols, toluene, ($C_1$-$C_6$alkyl)-$C_1$-$C_6$ esters, ($C_1$-$C_6$)$_2$C=O ketones, and miscible combinations thereof. In order to comply with limits on volatile organic content (VOC) and waste treatment, in certain inventive embodiments, the slurry is aqueous. As will be detailed hereafter, a self-contained slurry is also provided with solvent recycle thereby obviating concerns about solvent VOC content and handling.

In certain embodiments of the present invention, thermoplastic fibers are overmolded to make up at least 25 total weight percent of the fiber content by a weight percentage of fibers. It is appreciated that continuous, direction use of such thermoplastic fibers are also operative in the current invention. Typical lengths of the thermoplastic fibers are between 0.5 and 10 cm. Typical diameters of the thermoplastic fibers are between 0.01 and 0.7 mm. In some embodiments, thermoplastic fillers with an aspect ratio between longest dimension and shortest dimension of the thermoplastic filler of less than 10:1 is also used herein in combination with the thermoplastic fillers. It should be appreciated that the thermoplastic fibers must form a fusion bond with at least 1.3 other individual thermoplastic fibers based on a statistical average. In still other embodiments each thermoplastic fiber forms between 1.5 and 8.4 bonds to other thermoplastic fibers. It should be appreciated that small diameter and long length thermoplastic fibers have increased fusions bonds relative to thicker and shorter fibers for a given weight percentage of thermoplastic fibers.

The present invention affords particular advantages in terms of recycled content, strength, density, or a combination of such properties through the inclusion of mixed fiber fillers. In certain embodiments, carbon filler fiber represents 5 to 60 total fiber weight percent of the preform. In certain embodiments, glass filler fiber represents 20 to 60 total fiber weight percent of the preform. In certain embodiments, cellulosic filler fiber represents 0 to 10 total fiber weight percent of the preform.

In certain inventive embodiments, the mixed filler fibers have a median length that is between 80 and 1000% of the average length of the thermoplastic fibers. In general, a fiber filler should have an intersection with a statistical average of at least 2.2 thermoplastic fibers in an insert produced according to the present invention. In other embodiments of the present invention, an inventive insert has a mean filler fiber length that is proportional to the reciprocal square root of the number of fusion bonds between thermoplastic fibers. Without intending to be bound by a particular theory, when the number of thermoplastic fiber bonds is comparatively low, longer fill fibers interweave between fusion points and create added mechanical stability to the fusion bonded and cooled insert produced according to the present invention.

In still other embodiments of the present invention, thermoplastic fibers constitute 30-85 total fiber weight percent with mixed fiber fillers being present along with cellulosic fiber fillers also being present. In another particular embodiment, the glass and or carbon fiber fillers are present at a higher weight percentage than the cellulosic fibers.

The use of hydrophobic fibers in a water based slurry is promoted in the present invention by inclusion of a dispersing agent that serves to debundle and otherwise create randomized and individual dispersed fibers from chopped mixed fiber fill include small molecules or monomers with a molecular weight of less than 500 atomic mass units and having the general formula $(R^1)_2$—C=N—$R^2$ or $R^3$-pyrrolidines, where $R^1$ in each instance is independently H, $C_1$-$C_6$ alkyl, $C_1$-$C_6$ alkenyl, and $C_1$-$C_6$alkyl having a substituent, the substituent being H, OH, COOH, $NH_2$, NH $C_1$-$C_6$ alkyl or $R^1$ in both instances are contented to form a 5 or 6 member ring structure; $R^2$ is $C_1$-$C_6$ alkyl, OH, and $C_1$-$C_6$ alkyl having a substituent, the substituent being H, OH, COOH, $NH_2$, NH $C_1$-$C_6$ alkyl; or $R^1$ and $R^2$ combine to form a 5 or 6 member ring structure and $R^3$ is H, $C_1$-$C_6$ alkyl, $C_1$-$C_6$ carboxyl, $C_1$-$C_6$ hydroxyl, or ($C_1$-$C_6$)—$NH_2$. Exemplary molecular dispersing agent include imidazoline, guanidine, oximes, and proline. Exemplary polymeric dispersing agents include polymeric imidizolines such as those detailed in U.S. Pat. No. 3,288,707 including those based on a 2-vinyl imidazoline. A dispersing agent in typically present in a fully formulated slurry from 0.01 to 1 total weight percent.

A dispersing agent for fibers includes a conventional surfactant, or a colloidal particulate filler. Such particulate fillers illustratively include colloidal silica, calcium carbonate, mica, clays, and combinations thereof. Colloidal fillers typically have a diameter of between 2 and 20 times the diameter of the thermoplastic fibers present in the slurry. Without intending to be bound to a particular theory, colloidal filler with this size differential relative to fibers promotes retention of particles in the fiber mass.

To facilitate a rapid build in viscosity as the solvent is removed from an inventive slurry, a polymeric binder is provided in certain embodiments. The binder limits the ability of fibers to migrate under the forces of drying as water or other solvent is removed from slurry on a mold surface. Binders operative herein in aqueous based slurries illustratively include lignosulfonates; proteins such as albumin; polyethylene glycols and especially those with molecular weights of between 600 and 1000; polyvinyl alcohols, pectins, and alkylated celluloses, and combinations thereof. Binders for hydrophobic slurries illustratively include polyvinylpyrrolidones, polystyrenes, cellulosic fillers, and combinations thereof. A binder is typically present in an amount of up to 1 total weight percent of a slurry.

The slurry in some embodiments also includes additional additives to facilitate slurry handling and storage. Such additional additives include chelating agents, antimicrobials, antifoaming agents, antistatic agents, and combinations thereof. Such additional additives, if present, a typically individually present in a slurry from 0.00001 to 0.1 total weight percent of the fully formulated slurry.

Wet molding with inventive mixed fibers to achieve a high tensile strength article of minimal thickness, and if desired, automotive body panel surface quality finish. A satisfactory surface quality is defined by ASTM D523.

Figure 4A:
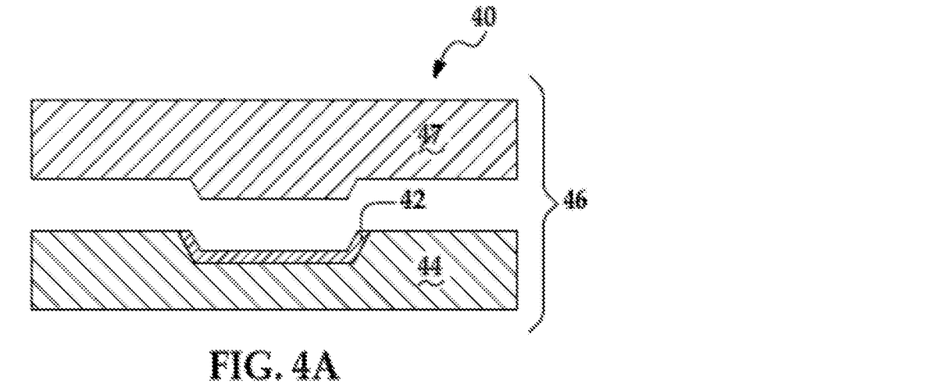
FIGS. 4A-4F are sequential schematic views of a wet molding process using a preform of the present invention.

A process of wet molding according to the present invention is detailed generally at 40 with respect to FIGS. 4A-4F. This schematic depicts a composite of several different individual processes that vary in the form and location of the mixed fiber sources. In FIG. 4A, mixed fiber preform 42 is positioned into contact with a first platen 44 of a mold 46. The mold 46 is depicted as a two-part mold with a complementary, second platen 47 that define a mold cavity with dimensions associated with the molded and cure article or a layer of the article. It is appreciated that a mold used in the present invention can include more than two platens or have a single platen with material urged into conformance with the platen surface with pneumatic pressure. The preform 42 is readily formed by overmolding with a thermoplastic fiber as detailed above, or a preform pre-impregnated with uncured resin.

Figure 4B:
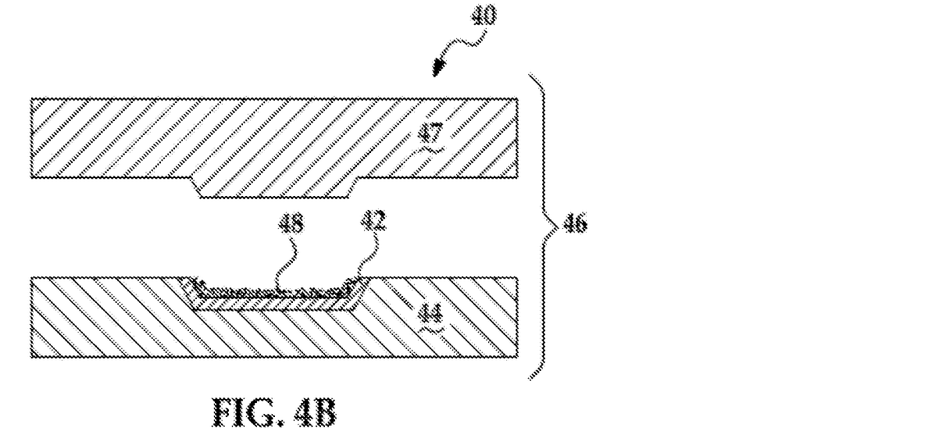

In FIG. 4B, a layer of chopped mixed fiber 48 is applied in place of, or in addition to the preform 42. In FIG. 4B, the preform 42 is depicted as present and the layer 48 applied thereof. It is appreciated that the layer of chopped mixed fiber 48 is readily applied directly onto the platen 44. The layer of chopped mixed fiber 48 is produced from a mixed fiber tow, woven fabric, or non-woven, as depicted in FIGS. 1-3, respectively. The layer of chopped mixed fiber 48 has a greater degree of homogeneity than applying such fibers from a separate source of each fiber.

Figure 4C:
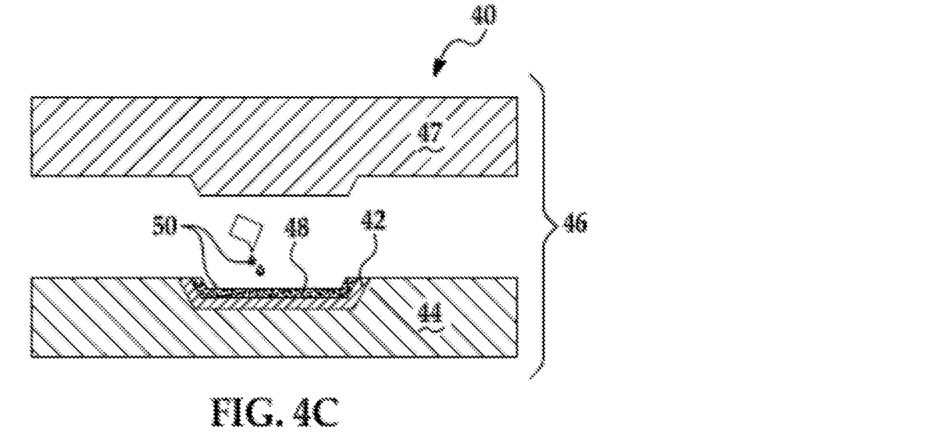

In FIG. 4C, an optional woven or non-woven sheet 50 is placed into the open mold cavity defined by platen 44 and over the preform 42, the layer of chopped mixed fiber 48, or the combination thereof. The sheet 50 is contemplated to be added to articles in which a high degree of strength is needed. The fabric 50 illustratively includes a mixed fiber fabric as detailed above, a conventional thermoplastic fabric, a woven metallic, a polyaramid, a glass fabric, or a combination thereof.

Figure 4D:
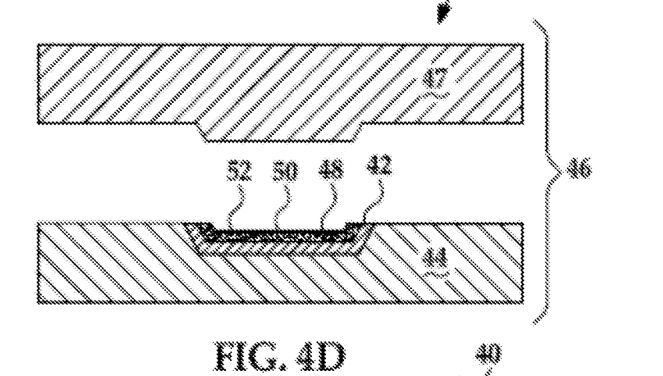

In FIG. 4D, a curable resin 52 is applied as a syrup and is typically poured to a desired thickness over materials in the mold cavity of 42 or 48, each alone, in combination, or still further with sheet 50. The resin 52 is one or more of the curable resins detailed above. By pouring the resin into the mold cavity. The resin 52 in some inventive embodiments is premixed with fillers, the fillers in some instance of the present invention including mixed chopped fibers of the present invention. Regardless of whether the resin 52 is the minimal lateral resin movement occurs upon contact with the mold cavity contents thereby inhibiting the partially oriented and inhomogeneous fiber fill associated with RTM and SMC processes. It is appreciated that the resin 52 degrades in response to contact with the air (and in the absence of a timely and suitable thermoset heating and compression process). It is appreciated that through selection of the resin, resort to a non-reactive gas mixture, rapid mold closure, or a combination of such ameliorative steps that resin degradation prior to cure are largely mitigated.

Figure 4E:
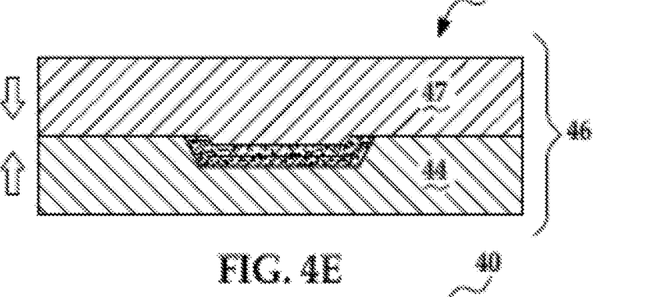

At FIG. 4E, the appropriate heat and compressive forces are applied through the closure of platen 47 toward platen 44 prior to air degradation of the resin 52. To facilitate throughput in mold 46, conventional molding processes are readily employed that illustratively include: applying a vacuum to the mold cavity to facilitate degassing, application of a mold release to the mold platens, preheating one or more of the mold platens, or a combination thereof. With application of heat and pressure, the resin permeates the stack of materials preloaded into the mold and cures the mixed fibers into a cured resin matrix. In an alternative embodiment, fluid pressure is applied in lieu of platen pressure to achieve molding; with gas pressure being particular advantageous and well suited for open molding.

Figure 4F:
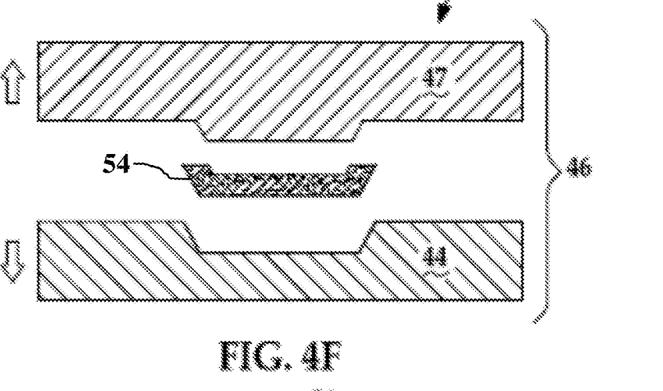

In FIG. 4F, the molded pan 54 is either an article per se or layer of an article is removed from contact with the mold platens 44 and 47. The molded part 54 in some inventive embodiments is subjected to finishing operations such as trimming sanding, planning, powder priming, priming, painting, or a combination thereof.

Figure 5:
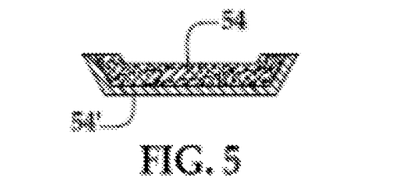
FIG. 5 is a cross-sectional schematic view of a molded part produced per FIGS. 4A-4F, nested with a similar mold to form a dual layer molded inventive article.

In instances where the molded part 54 is a layer of a molded article, the molded part 54 is joined to a similar molded part 54' to produce a dual layer article with the proviso that molded part 54' is sized to accommodate the nest of parts 54 and 54', as shown in FIG. 5. The molded parts 54 and 54' are illustratively joined with mechanical fasteners, contact adhesives, or sonic welding. In certain inventive embodiments, parts 54 and 54' vary in the relative amount of carbon fiber relative to primary fiber. In other inventive embodiments, the primary fiber is glass. In still other embodiments the outer part (54 or 54') has a higher percentage of epoxy coated glass fiber relative to carbon fiber compared to the inner part (the other of 54 or 54') and the outer part has, or is capable of being finished to a gloss for a new vehicle body.

The incorporation of the glass microspheres into part 54 that cross-link to the resin matrix are present in certain inventive embodiments to reduce density and improve the strength of the resultant article. Such microspheres are in US 2006/0258781; and U.S. provisional application 62/018,377.

EXAMPLES

Example 1

Figure 6:
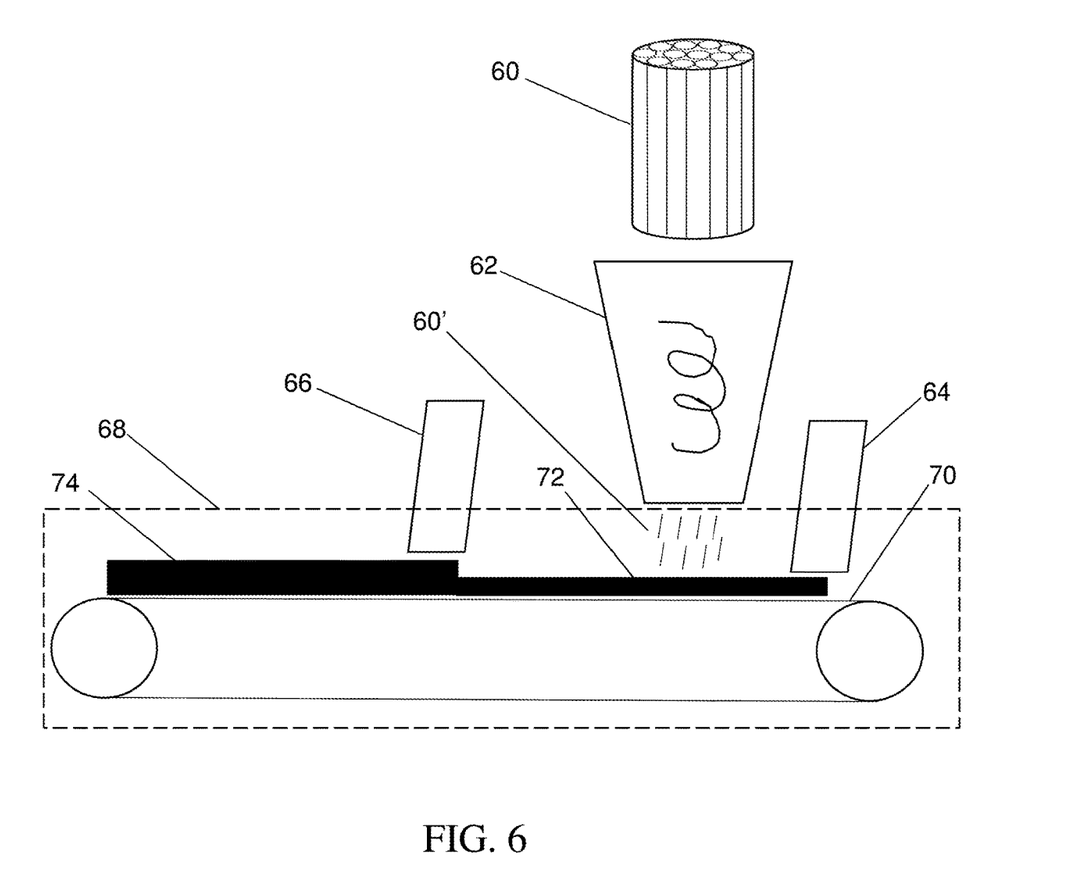
FIG. 6 illustrates a process line for forming an article with epoxy coated glass fibers in accordance with embodiments of the invention.

As shown in FIG. 6, epoxy coated glass fibers 60 are introduced in to a cyclone 62 (FidoCut) to drop the cut and dispersed epoxy coated glassfibers 60' on to a layer of uncured resin 72 that is applied to an underlying conveyor 70 from a first film applicator 64 (doctor box). An overcoat 74 with uncured resin is then applied from a second doctor box 66, or a binder is used to form a preform and then overmold the preform. The process takes place in a temperature and atmospheric controlled chamber 68.

Example 2

The resulting parts formed in Example 1 have a call out strength (>300 MPa) where the glass gives strength and carbon fiber gives modulus. Part thicknesses of 0.8-3.5 mm are obtained.

Example 3

A single layer part is formed as described in Example 1 with glass microspheres introduced to lower density and provide a high gloss finish.

Example 4

A two-layer part is formed with an epoxy coated glass fiber rich outer layer and a carbon fiber rich inner layer.

Example 5

A two-layer part is formed with a pure epoxy coated glass fiber outer layer and a carbon fiber rich inner layer.

The foregoing description is illustrative of particular embodiments of the invention, but is not meant to be a limitation upon the practice thereof. References cited herein are hereby incorporated by reference to same extent as if each reference is explicitly and specifically incorporated by reference.

The invention claimed is:

1. A dual layer cured composite article comprising:
   an outer part having an outer part thickness composed of a first resin matrix having between 50 and 70 total weight percent of said outer part of an outer part mixed fiber filler, said mixed fiber filler having an outer part primary fiber:carbon fiber ratio of 0.05-20:1;
   an inner part complementary to said outer part and having an inner part thickness composed of a second resin matrix having between 40 and 60 total weight percent of said inner part of an inner mixed fiber filler, said inner mixed fiber filler having an inner part primary fiber:carbon fiber ratio of less than said outer part primary fiber:carbon fiber ratio, the inner part primary fiber being epoxy coated glass fibers; and
   a joinder between said outer part and said inner part.

2. The article of claim 1 wherein said outer part mixed fiber filler are a woven fabric or a nonwoven fabric of combined primary fiber and carbon fiber.

3. The article of claim 1 wherein said outer part mixed fiber filler are chopped fibers from a combined tow of primary fiber and carbon fiber.

4. The article of claim 3 wherein said chopped fibers have a length of between 10 mm and 100 mm.

5. The article of claim 3 further comprising a thermoplastic overmolding defining a preform.

6. The article of claim 1 wherein said inner part mixed fiber filler are chopped fibers.

7. The article of claim 1 wherein said outer part primary fiber:carbon fiber ratio is 0.6-1.3:1.

8. The article of claim 1 wherein said outer part has a density of 1.1 to 1.3.

9. The article of claim 1 wherein said inner part has a density of 1.1 to 1.6.

10. The article of claim 1 wherein said outer part is adapted to receive an automotive body panel surface gloss.

11. The article of claim 1 wherein said joinder is a contact adhesive.

12. The article of claim 1 having a shape of a vehicle deck lid, a vehicle door, a vehicle roof, a vehicle fender, or a vehicle floor.

13. The article of claim 1 wherein carbon fiber in said inner is recycled.

* * * * *